(12) United States Patent
Tetzlaff et al.

(10) Patent No.: US 8,730,604 B2
(45) Date of Patent: May 20, 2014

(54) WRITING A REFERENCE PATTERN TO BIT PATTERNED MEDIA

(75) Inventors: David Erich Tetzlaff, Minnetonka, MN (US); Puskal P. Pokharel, Edina, MN (US); Rene Johannes Marinus van de Veerdonk, Pleasanton, CA (US)

(73) Assignee: Seagate Technology LLC, Cupertino, CA (US)

( * ) Notice: Subject to any disclaimer, the term of this patent is extended or adjusted under 35 U.S.C. 154(b) by 238 days.

(21) Appl. No.: 13/173,861

(22) Filed: Jun. 30, 2011

(65) Prior Publication Data

US 2013/0003215 A1    Jan. 3, 2013

(51) Int. Cl.
G11B 5/09     (2006.01)
G11B 5/596    (2006.01)

(52) U.S. Cl.
USPC .......................... 360/51; 360/77.08

(58) Field of Classification Search
None
See application file for complete search history.

(56) References Cited

U.S. PATENT DOCUMENTS

| | | | |
|---|---|---|---|
| 7,489,463 B2 * | 2/2009 | Hashimoto et al. | 360/51 |
| 2010/0118427 A1 | 5/2010 | Buch et al. | |
| 2010/0118428 A1 | 5/2010 | Buch et al. | |
| 2010/0202079 A1 | 8/2010 | Buch et al. | |

* cited by examiner

*Primary Examiner* — Regina N Holder
(74) *Attorney, Agent, or Firm* — Braden Katterheinrich

(57) ABSTRACT

A given reference pattern is written on bit patterned media that has an initial reference pattern already disposed thereon. A write phase and frequency is detected based on the initial reference pattern and the given reference pattern is written on the bit patterned media at the detected write phase and frequency.

19 Claims, 7 Drawing Sheets

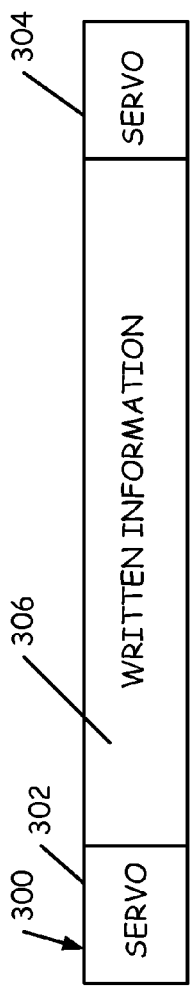
FIG. 2A
FIG. 2B
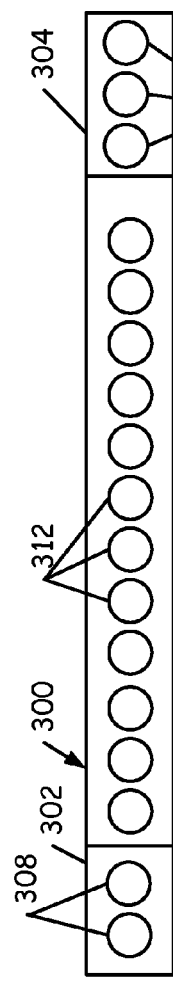
FIG. 2C
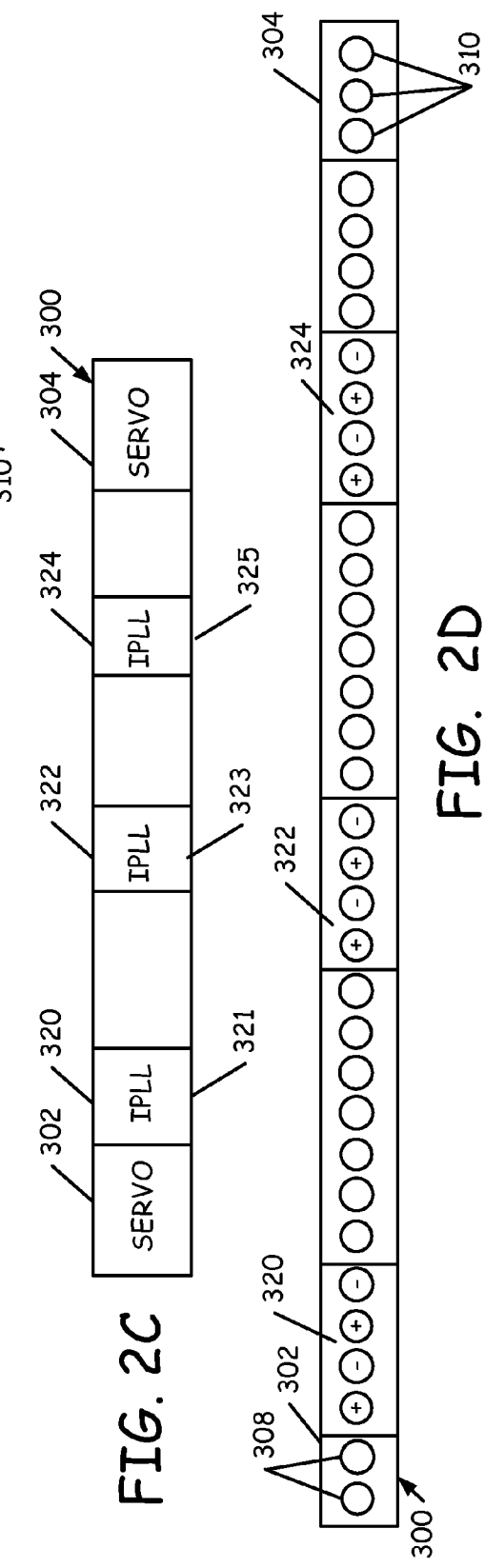
FIG. 2D

WRITING A REFERENCE PATTERN TO BIT PATTERNED MEDIA

BACKGROUND

Data storage systems often include storage media, supplementary electronic components, mechanical parts, software, and other components. Storage media in such data storage systems can include, for example, an array of discs or other storage media.

Bit patterned recording media comprises an array of magnetic islands that are spaced apart from one another on a media surface. The spaces between the patterned islands are filled with non-media material to provide a smooth surface for the reading or writing component to move over. The non-media material separates the magnetic islands from one another. A bit of data is recorded on one or more of the islands.

Reference patterns on the media are used to give a relative position of the reading or writing component, relative to the magnetic islands on the media. Sometimes, the reference pattern is not precisely coherent with the remaining magnetic islands on the storage medium. Writing the reference patterns on the medium, so that they are coherent with the remaining magnetic islands, can be difficult.

Aspects of the present disclosure address these and/or other problems.

SUMMARY

A given reference pattern is written on bit patterned media that has an initial reference pattern already disposed thereon. A write phase and frequency is detected based on the initial reference pattern and the given reference pattern is written on the bit patterned media at the detected write phase and frequency.

In accordance with one aspect, a write clock is then locked on to a write phase and frequency detected based on the given reference pattern, and a subsequent reference pattern is written at the write phase and frequency detected at the given reference pattern.

In accordance with another aspect, a further subsequent reference pattern is written on the bit patterned media by locking the write clock onto a write phase and frequency detected at the given and subsequent reference patterns, and then writing the further subsequent reference pattern.

Other features and benefits that characterize embodiments of the present disclosure will be apparent upon reading the following detailed description and review of the associated drawings.

BRIEF DESCRIPTION OF THE DRAWINGS

FIGS. 2A-2D illustrate tracks on a bit patterned medium.

DETAILED DESCRIPTION OF ILLUSTRATIVE EMBODIMENTS

The description corresponding to FIGS. 1-7 below illustrate how reference patterns can be written on bit patterned media. In one embodiment, a write clock locks on to an initial reference field (such as a servo field) on a given track, and writes a first reference pattern subsequent to the initial reference pattern at the write phase and frequency of the reference field. The initial reference pattern is one already disposed on the given track before the first reference pattern is written. Then, the write clock is locked on to the first reference pattern that was just written, and writes a subsequent reference pattern at the write phase and frequency of the first-written reference pattern. Subsequent reference patterns are written by using the previously-written reference patterns as a timing and phase reference. However, before describing these embodiments in detail, an example of a storage device in which these embodiments can be used will be discussed.

Figure 1:
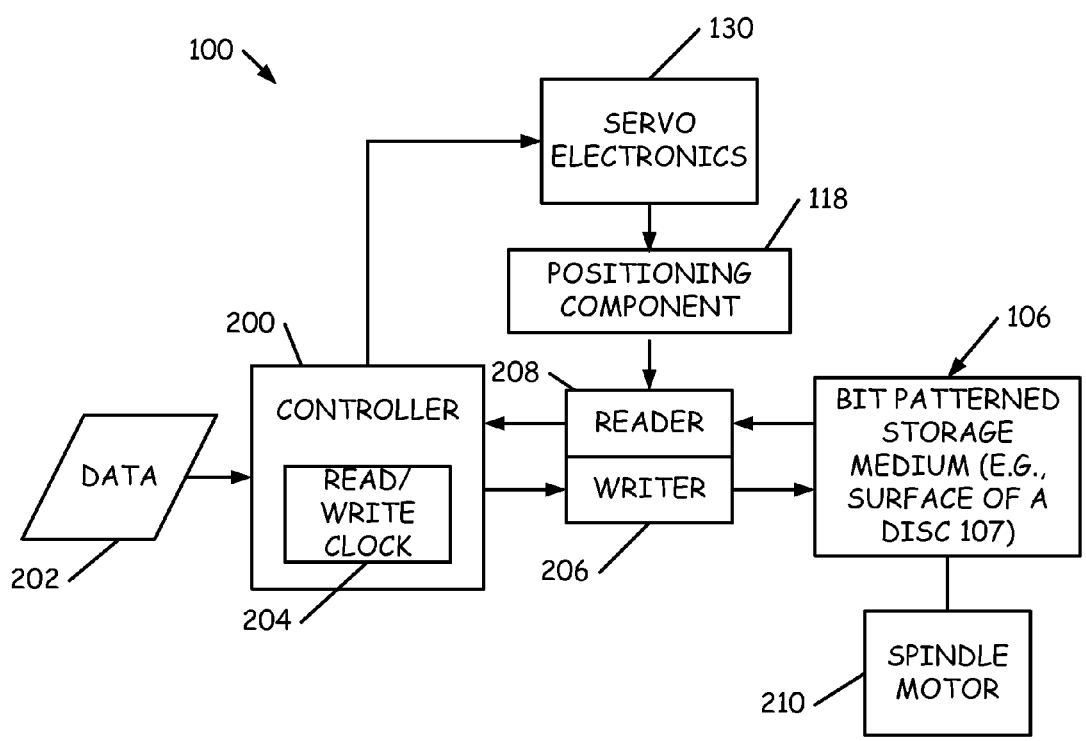
FIG. 1 is a simplified block diagram illustrating some components of a data storage system that uses bit patterned media.

FIG. 1 is a simplified block diagram illustrating one embodiment of a data storage system 100. FIG. 1 shows that system 100 illustratively includes a controller 200 that receives data 202 that is to be written to the bit patterned storage medium, (such as the surface of disc 107). Controller 200 includes a read clock and write clock (shown collectively at 204) which control the phase and frequency at which data is written to medium 106 using writer 206, and the phase and frequency at which data is read from media 106 using reader 208. FIG. 1 also shows a spindle motor 210 used, in the case in which the data storage medium includes a disc drive, to rotate the discs which comprise bit patterned storage medium 106.

FIG. 2A shows one example of a track 300 on media 106. Track 300, when it is disposed on a disc 107, will illustratively be circular, and continuous. However, it is shown in a linear fashion in FIG. 2A for exemplary purposes only. It should be noted, in one embodiment, FIG. 2A also shows only part of an entire circular track 300. The portion of track 300 shown in FIG. 2A, shows two servo fields 302 and 304 and written information field 306. Servo fields 302 and 304 illustratively have reference patterns that, when disposed on track 300, provide cross track, or down track (or both) position information used by controller 200 to control servo electronics 130 (shown in FIG. 2) such that a positioning component 118 (such as a voice coil motor) positions the writer 206 or reader 208 over the magnetic islands in the written information field 306 of track 300.

FIG. 2B shows another simplified diagram of track 300. FIG. 2B shows that servo fields 302 and 304 have reference patterns that are generated during the patterning process which disposes the magnetic islands on track 300. It can be seen in FIG. 2B that the servo fields 302 and 304 are patterned regions where the servo pattern is defined by a pattern of the physical presence or absence of magnetic islands 308 and 310 along the length of servo fields 302 and 304. That is, during the patterning process, servo fields 302 and 304 will not be fully populated with a full array of magnetic islands. Instead, some of the physical magnetic islands will be omitted so the spacing of the physical magnetic islands in servo fields 302 and 304 defines a pattern. Therefore, moving along the length of servo fields 302 and 304, some of the magnetic islands will be present and some will be absent such the presence or absence defines a pattern. FIG. 2B also shows that in the written information field 306 a full array of islands of magnetic material 312 are present. Of course, it will be appreciated that, instead of servo fields 302 and 304 having reference patterns that are defined by the pattern of presence or absence of magnetic islands, which are disposed on the disc during the patterning process (when the magnetic islands are constructed), the servo fields can have a full array of magnetic islands disposed thereon and the reference patterns can, themselves, be written on the full array of magnetic islands. Then, the magnetic polarity of each of the islands defines the servo pattern contained in each individual servo field and not the pattern of the physical presence or absence of the magnetic islands. However, for the sake of simplicity, track 300 is shown with servo fields 302 and 304 being patterned servo fields with reference patterns that are created during the patterning process that constructs the magnetic islands on the surface of the medium. Therefore, during that patterning process, servo fields 302 and 304 have islands created such that the islands are either present or absent at given locations along the fields, and it is the pattern of the presence or absence of the islands that defines the servo information corresponding to a given servo field.

The array of magnetic islands 312 in field 306 of the disc can be magnetized (written) in a positive or negative direction to indicate data stored in section 306. Therefore, to write information to a given island 312, write clock 204 must control writer 206 to write the information at a time when writer 206 is closely proximate the given island 312. Similarly, in order to read the data written to islands 312, reader 208 must be controlled by read/write clock 204 to read data at a time when reader 208 is closely proximate the islands 312.

It may happen that islands 312 are not perfectly coherent (in terms of spacing) with the servo islands 308 in servo field 302. It is more likely that islands 312 which are closely adjacent the islands 308 in servo field 302 will be coherent with islands 308. However, there is mechanical tolerance in the patterning process during which islands 308 and 312 are constructed on the surface of the media. Thus, the further a given island 312 is from servo field 302, the more likely it is that the mechanical tolerances will accumulate to a point that a given island 312 is no longer coherent with islands 308 in servo field 302.

In order to address the potential non-coherency, additional reference patterns can be written into field 306 of track 300. FIG. 2C shows that three additional reference patterns 320, 322 and 324, are written in fields 321, 323 and 325 (respectively) and are interspersed with the data islands 312 in field 306 of track 300. Of course the three reference patterns 320, 322 and 324 are illustrative only. The actual number of reference patterns written between servo fields may be greater or fewer than three, as desired. This number can be determined empirically, or based on the mechanical tolerances of the patterning system, or in other ways.

FIG. 2D shows one embodiment in which the reference patterns 320, 322 and 324 each contain islands that have alternating magnetic polarity written thereon. This allows read/write clock 204 to lock on to the reference patterns in fields 320, 322 and 324. A reference pattern in which the polarity of the islands switches at least once allows read/write clock 204 to be locked on to the proper read/write phase and frequency for the data islands 312 that follow each of the reference patterns 320, 322 and 324.

Figure 3:
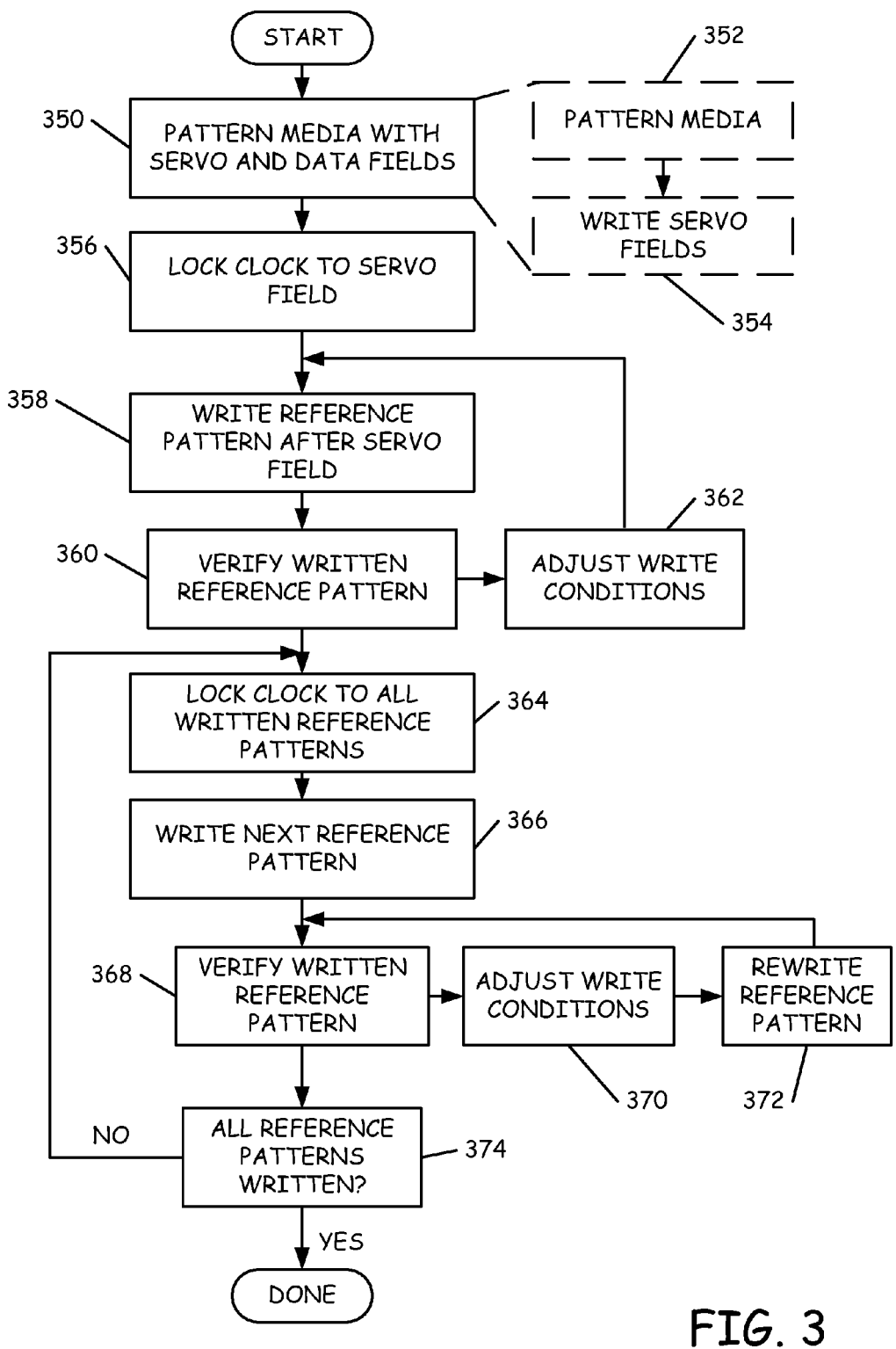
FIG. 3 is a flow diagram illustrating one embodiment of writing reference patterns on the bit patterned medium.
Figure 4:
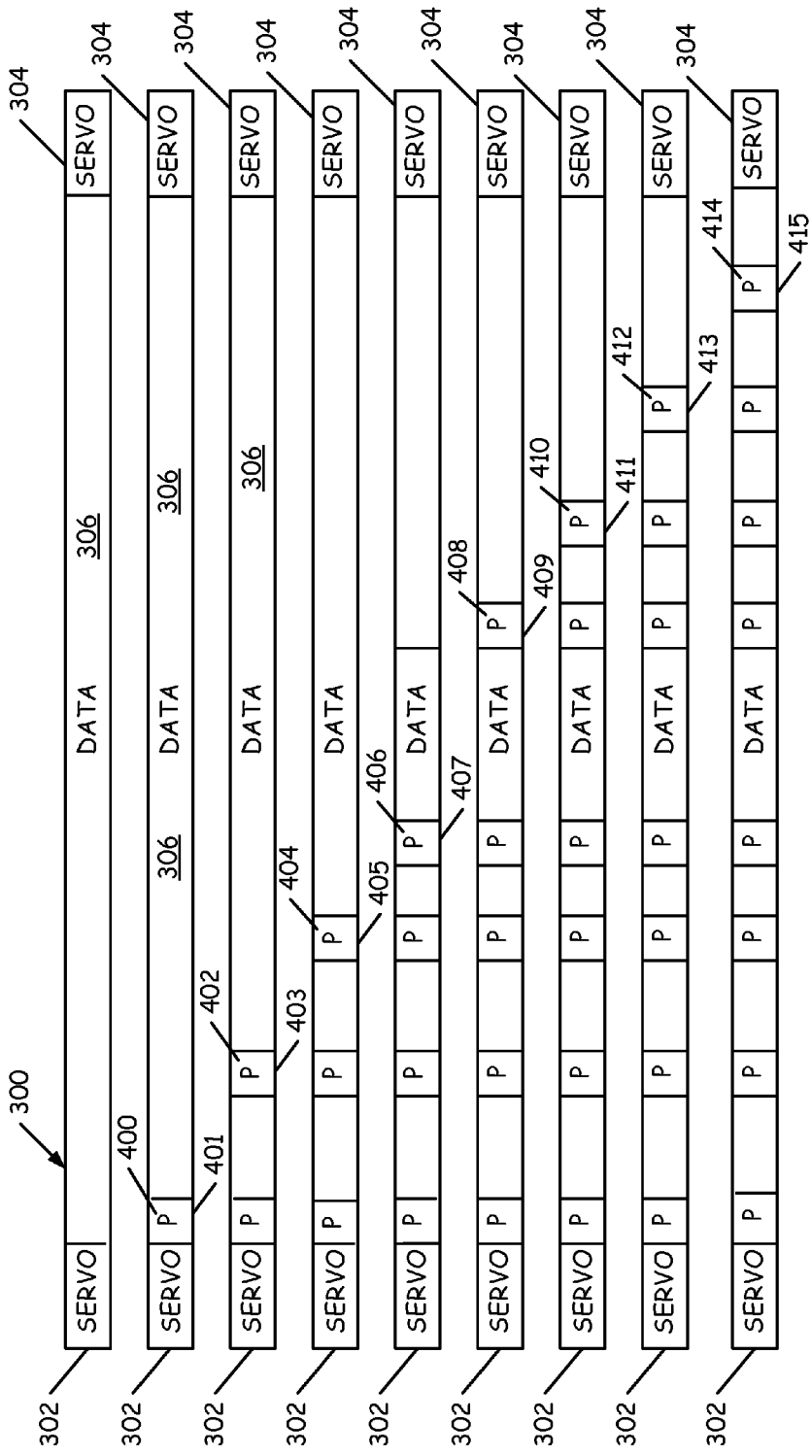
FIG. 4 shows one embodiment of a track having reference patterns written thereon.

Of course, it can also be difficult to locate islands 312, that are contained in each of the reference patterns 320, 322 and 324, in order to write the reference pattern information on those islands. FIG. 3 is a flow diagram illustrating one embodiment for writing these reference patterns. FIG. 4 illustrates one embodiment of track 300 at various times $t_1$-$t_8$ during the write process shown with reference to FIG. 3. It can be seen, of course, that the embodiment of track 300 shown in FIG. 4 contains eight reference patterns 400, 402, 404, 406, 408, 410, 412, and 414 written in reference fields 401, 403, 405, 407, 409, 411, 413, and 415, (respectively), between servo fields 302 and 304. This is but one exemplary embodiment. FIGS. 3 and 4 will now be described in conjunction with one another.

Initially, media 106 is patterned with a plurality of tracks 300, each including servo fields 302/304 and data fields 306. Of course, as with FIGS. 2A-2D, track 300 shown in FIG. 4 is illustratively only a portion of a continuous track that resides on the medium. The portion shows two servo fields 302 and 304 and a data field 306 that resides between the two servo fields. There may be additional servo fields and data fields on a given track as well, and the portion of track 300 shown in FIG. 4 is exemplary only.

Patterning the media to contain fields 302, 304 and 306 can be done in a wide variety of different ways. For instance, any number of lithographic or self assembly techniques can be used to create the islands of track 300 on the medium 106. Patterning the media with the servo and data fields is indicated by block 350 in FIG. 3.

FIG. 3 also shows an alternate embodiment. Instead of patterning the medium such that the servo fields 302 and 304 have patterns that are defined by the patterns of presence or absence of islands therein, the islands can be formed in the same way, and using the same spacing, as found in data field 306. Then, servo fields 302 and 304 can be written with servo information using a servo writer that writes the servo information on the magnetic islands in the servo fields, instead of encoding the servo information into the pattern of the presence or absence of islands in the servo fields 302 and 304. This is indicated by blocks 352 and 354 in FIG. 3. Blocks 352 and 354 are shown in phantom, indicating that they are alternate embodiments. FIG. 4 shows track 300 at time to after the media has been patterned with the servo and data fields.

Next, controller 200 locks read/write clock 204 onto the pattern in servo field 302 and writes a reference pattern 400, in a reference field 401 within data field 306 that immediately follows servo field 302 on track 300. Because reference pattern 400 is written to the islands in field 306 that immediately follow servo field 302, it is likely that the islands in pattern 400 are coherent with those in servo field 302. Of course, reference pattern 400 could be written in any spaced relation to servo field 302 as well, so long as the coherence between the islands in reference pattern 400 and servo field 302 is sufficient. Locking clock 204 to servo field 302 and writing reference pattern 400 in field 401 on track 300 is indicated by blocks 356 and 358 in FIG. 3.

It may happen that, even though reference field 401 is immediately adjacent servo field 302, the islands in field 401 are still not sufficiently coherent with the islands in servo field 302 to enable proper writing of information to the islands in reference field 401. Therefore, in the embodiments shown in FIG. 3, controller 200 next controls reader 208 to verify the reference pattern 400 by reading the information written to the islands in reference field 401, in order to ensure that the proper information was actually written. This is indicated by block 360 in FIG. 3. If the reference pattern 400 has not been properly written, then controller 200 makes adjustments to the write conditions used to write the reference pattern 400 in field 401. This is indicated by block 362 in FIG. 3. Adjusting the write conditions may include, by way of example, adjusting the frequency or phase of the write clock 204 used to write the information to reference pattern 400, or it may include slightly adjusting the down-track position of writer 206 that writes information to reference pattern 400. Of course, other adjustments can be made as well. For instance, controller 200 may adjust the write current used by writer 206, it can adjust the head/media spacing, writer cross-track position (obtained by servo field 302) or it may make other adjustments.

In any case, once the write conditions have been adjusted at step 362, controller 204 controls writer 206 to rewrite the reference pattern 400 in field 401 and to again verify the reference pattern 400. This is indicated by blocks 358 and 360.

In one embodiment, reference pattern 400 is reference information for a phase locked loop used to control the frequency and phase of clock 204. Therefore, once the reference pattern 400 has been written and verified, then controller 200 controls read/write clock 204 so that the phase and frequency of read/write clock 204 is locked to that defined by reference pattern 400, which has already been written and verified. This is indicated by block 364 in FIG. 3.

When the read/write clock 204 is locked to reference pattern 400, controller 200 then controls writer 206 to write the next reference pattern 402, in reference field 403, which follows reference pattern 400 in field 401. This is indicated by block 366 in FIG. 3.

After reference pattern 402 is written in field 403, controller 200 then again controls reader 208 and writer 206 to verify the reference pattern 402 to make sure it was accurately written to the islands in field 403. This is done by first reading the reference pattern 402 in field 403 and comparing it to the reference pattern that was supposed to be written to field 403. Verifying the reference pattern 402 in field 403 is indicated by block 368 in FIG. 3.

As with reference pattern 400, if the reference pattern 402 cannot be verified, then controller 200 adjusts the write conditions as indicated by block 370 and rewrites the reference pattern 402 to field 403. This is indicated by block 372 in FIG. 3.

Once reference pattern 402 has been verified ($t_2$ in FIG. 4), then controller 200 determines whether any additional reference patterns need to be written in data field 306 of track 300. This is indicated by block 374. If so, processing reverts to block 364 where controller 200 locks read/write clock 204 onto previously written reference patterns in field 306. In the example shown in FIG. 4, reference patterns 400 and 402 have been written and verified in fields 401 and 403. Therefore, as the writer 206 passes servo field 302, controller 200 controls read/write clock 204 so that it locks onto the phase and frequency defined by the reference patterns 400 and 402 in fields 401 and 403, and then it controls writer 206 to write reference pattern 404 in reference field 405 (all within field 306). Locking clock 204 onto previously written reference patterns is indicated by block 364 in FIG. 3 and writing the next reference pattern 404 in field 405 is indicated by block 366. As with the previous reference patterns, reference pattern 404 is then verified to make sure that it has been properly written. After it has been verified, then the portion of track 300 shown in FIG. 4 looks as illustrated at time $t_3$ in FIG. 4.

This process continues until all desired reference patterns have been written between servo fields 302 and 304. Therefore, at time $t_4$, reference pattern 406 is written in field 407. At time $t_5$ reference pattern 408 is written in field 409. At time $t_6$ reference pattern 410 is written in field 411. At time $t_7$ reference pattern 412 is written in field 413, and at time $t_8$ reference pattern 414 is written in field 415.

Of course, it will be noted that other methods can be used as well. For instance, instead of locking on to all previously written reference patterns in a given data field 306, controller 200 may simply lock read/write clock 204 on to the immediately previous reference pattern, in order to write the immediate subsequent reference pattern. For instance, at time $t_3$, in order to write reference pattern 404 in field 405, controller 200 may simply lock read/write clock 204 on to the phase and frequency defined by reference pattern 402 in field 403, instead of on to both reference patterns 400 and 402. This is one alternative embodiment for writing the reference patterns.

It will also, be appreciated that in one embodiment, this process is repeated for the reference patterns written in each data field 306 on a given track 300. Controller 200 can control writer 206 and reader 208 to write one reference pattern on each data field 306 on track 300, and then to lock on to those reference patterns and write a next reference pattern in each data field 306 on track 300, etc. Alternatively, controller 200 can control reader 206 and writer 208 to write the reference patterns, in the way described above with respect to FIG. 3, for one data field 306 until that data field has all reference patterns written to it, and then controller 200 can proceed to write the reference patterns to the remaining data fields on track 300. In either case, controller 200 illustratively locks read/write clock 204 onto a previous reference pattern, in order to write the next subsequent reference pattern.

This way of writing reference patterns can also be used to write the servo fields based on a very limited patterned reference field. That is, instead of deploying all of the servo fields during the patterning process, a small reference field can be deployed during patterning, and that can be used to write the servo fields. In addition, a synchronously written reference pattern in the data field 306 can be used as an alignment mark for writing the servo and additional reference patterns.

Figure 5:
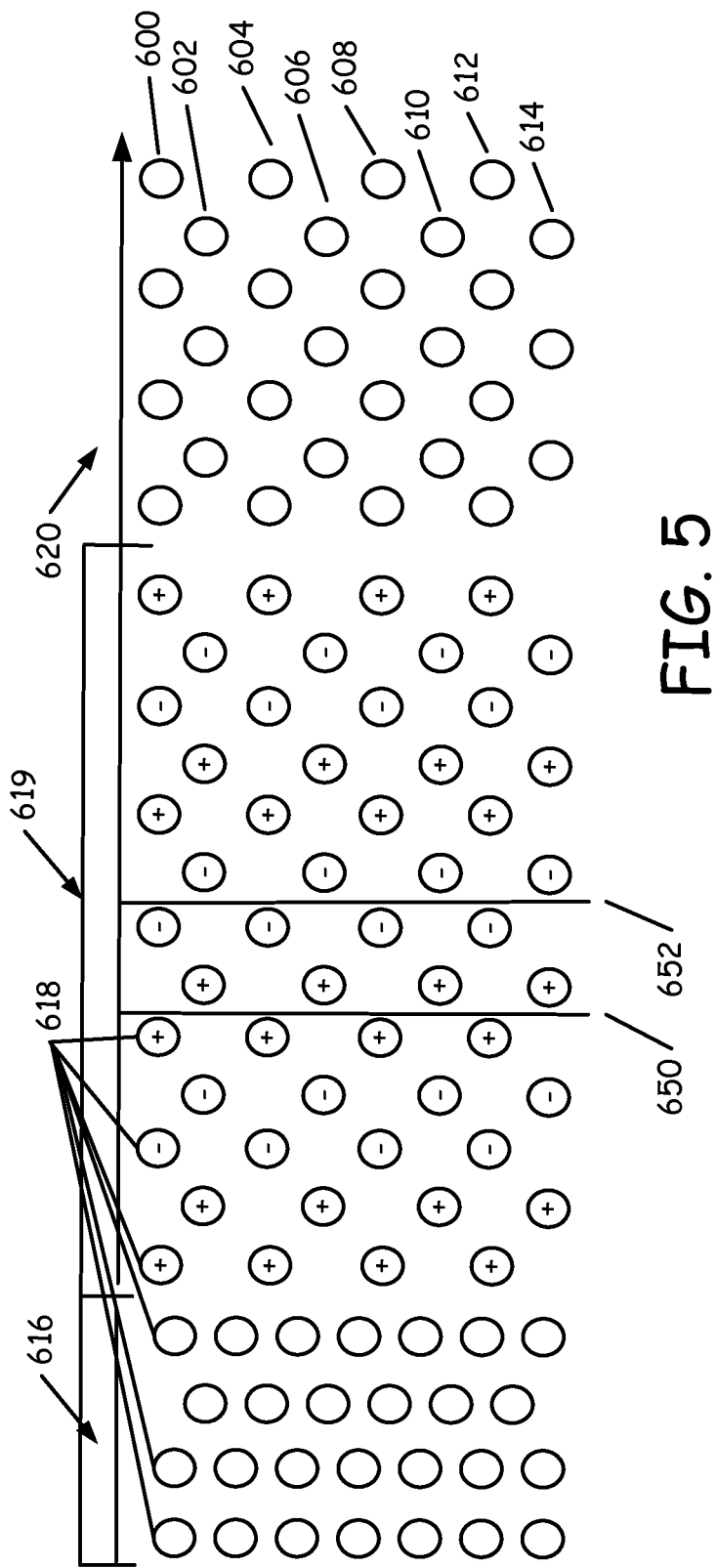
FIGS. 5-7 illustrate examples of three different reference patterns that can be written.

It has also been found that, even though the reference patterns are written in the way described above, there can be a phase shift between the reference patterns in two adjacent tracks on media 107, and this can present difficulties. For instance, FIG. 5 shows an enlarged portion of a plurality of tracks 600-614. Each of tracks 600-614 includes a servo field 616 that contains servo information, a reference pattern 618 written in a reference pattern field 619, and a data field 620 that contains data written therein. It can be seen that the reference patterns 618 in reference fields 619 are reference patterns that simply alternate between positive and negative magnetization on the islands disposed in field 619. That is, the reference patterns are 50 percent duty cycle patterns. Because of the way patterning disposes islands on adjacent fields, and because of the particular pattern written in fields 619, there is a phase shift in the signal generated by reading the reference patterns 618 of any two adjacent tracks 600-614. For instance, FIG. 5 has two lines, one corresponding to a signal maximum 650 and another corresponding to a signal minimum 652 generated by the reader 208 as it reads field 619 for adjacent tracks. In other words, because, tracks 600 and 602 exhibit a phase shift therebetween, the signal maximum 650 and the signal minimum 652 are actually located after (or before) the center of positive and negative magnetization (respectively) for the two tracks. This phase shift between adjacent tracks can lead to difficulty in writing and reading data from the islands in the reference fields 619.

Figure 6:
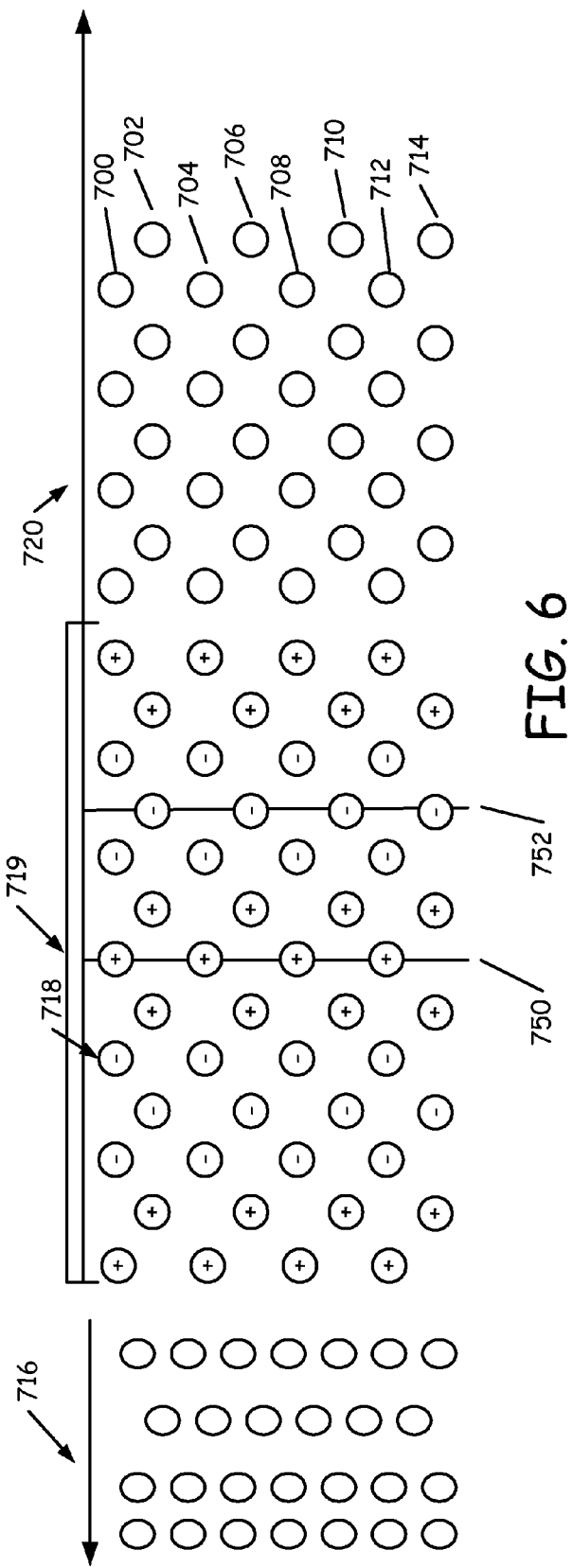

Therefore, FIG. 6 shows a plurality of tracks 700-714, each of which has a phase coherent reference pattern 718 written in a reference field 719. FIG. 6 also shows that the tracks have corresponding servo fields 716 and data fields 720. It can be seen in FIG. 6 that the reference patterns 618 written in reference fields 619 do not have a 50 percent duty cycle in the magnetization patterns written thereon. By changing the reference patterns in this way, it can be seen that adjacent reference tracks are phase coherent. That is, the signal maximum lies precisely at the center of positive magnetization of all tracks while the signal minimum lies precisely at the center of negative magnetization of all tracks. This is in contrast to the pattern shown in FIG. 5 in which the signal maximum actually occurs when the reader is between the positive and negative magnetizations. For example, the peak of positive magnetization in the pattern in track 700 is on the positively magnetized islands. On track 702, it is between two positively magnetized islands. This corresponds to signal maximum line 750. The peak negative magnetization in track 700 lies between the two negatively magnetized islands and on the negatively magnetized island in track 702. This corresponds to signal minimum line 752. Therefore, the pattern in FIG. 6 introduces substantially no phase shift between adjacent tracks.

In the embodiment shown in FIG. 6, the reference pattern written on adjacent tracks is referred to as a 6T pattern. That is because on the adjacent tracks, the reference pattern repeats every three islands. However, since the reference pattern on adjacent tracks is different, it takes six total islands (three on one of the adjacent tracks and three the other or 3+3) to define the entire reference pattern.

Figure 7:
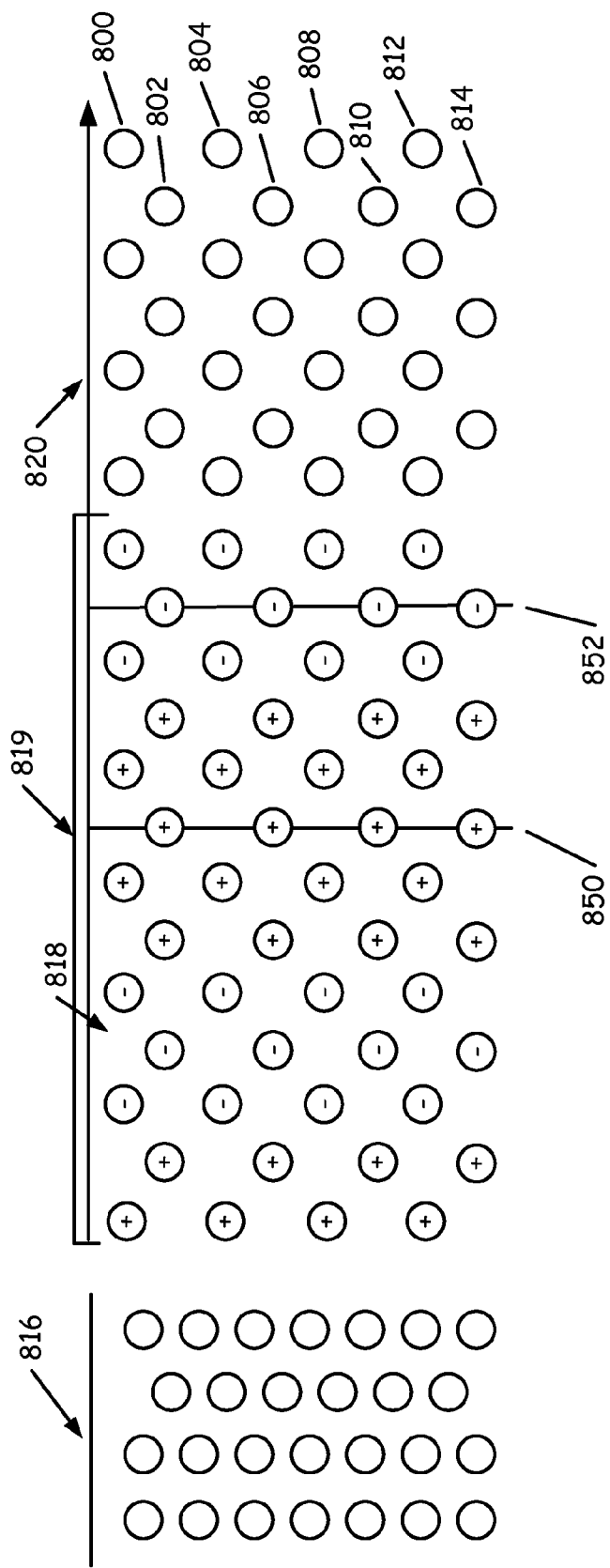

FIG. 7 shows yet another reference pattern. Similar to the embodiment shown in FIG. 6, FIG. 7 shows a medium with a plurality of tracks 800-814 disposed thereon. Each track has a reference pattern 818 written in a reference field 819, and servo information disposed in servo field 816, along with a data field 820. FIG. 7 shows that the reference patterns 818 written on adjacent tracks are phase coherent. That is, a signal maximum for the reference pattern is disposed precisely at the center of the positive magnetizations in reference pattern 818, and the signal minimum is disposed precisely at the center of the negative magnetizations in reference pattern 818. Therefore, as with the reference patterns shown in FIG. 6, phase coherence between reference patterns on adjacent tracks makes it much easier to accurately position the reader 208 and writer 206 and to write information to data fields 820. The pattern in FIG. 7 can be referred to as an 8 T pattern because the reference pattern repeats every 5 islands on one track and every 3 islands on an adjacent track (or 5+3). This can be generalized to any combination of two odd numbers.

It is to be understood that even though numerous characteristics and advantages of various embodiments have been set forth in the foregoing description, together with details of the structure and function of various embodiments, this disclosure is illustrative only, and changes may be made in detail, especially in matters of structure and arrangement of parts within the principles in the disclosure to the full extent indicated by the broad general meaning of the terms in which the appended claims are expressed. For example, the particular elements may vary depending on the particular application and density of the bit patterns on the storage system while maintaining substantially the same functionality without departing from the scope of the disclosure. In addition, although one embodiment described herein is directed to a disc drive system it will be appreciated by those skilled in the art that the teachings can be applied to any bit patterned medium, without departing from the scope of the disclosure.

What is claimed is:

1. A method comprising:
   detecting a write phase and frequency based on an initial reference pattern disposed on bit patterned media; and
   writing a subsequent reference pattern on the bit patterned media at the detected write phase and frequency.

2. The method of claim 1 wherein writing a subsequent reference pattern comprises writing a first reference pattern following the initial reference pattern on the bit patterned media.

3. The method of claim 2 wherein writing a reference pattern comprises:
   locking a write clock to the detected write phase and frequency detected based on the initial reference pattern.

4. The method of claim 3 and further comprising:
   detecting the write phase and frequency based on the first reference pattern; and
   writing a next subsequent reference pattern, subsequent to the first reference pattern, at the write phase and frequency detected based on the first reference pattern.

5. The method of claim 4 and further comprising:
   writing a further subsequent reference pattern by detecting a write phase and frequency of an immediately previous reference pattern; and
   writing the further subsequent reference pattern at the write phase and frequency detected in the immediately previous reference pattern.

6. The method of claim 5 wherein writing the further subsequent reference pattern comprises:
   detecting the write phase and frequency from all previous reference patterns written prior to the further subsequent reference pattern and following the initial reference pattern.

7. The method of claim 6 wherein the bit patterned media includes a plurality of concentrically arranged tracks of bits, and further comprising writing a plurality of reference patterns on each of the tracks such that reference patterns on adjacent tracks are phase coherent.

8. The method of claim 7 wherein the reference patterns on adjacent tracks are written such that a signal maximum generated by reading the reference patterns on one of the adjacent tracks corresponds to a down-track signal maximum when reading another of the adjacent tracks.

9. The method of claim 7 wherein the reference patterns on adjacent tracks are written such that a signal minimum generated by reading the reference patterns on one of the adjacent tracks corresponds to a down-track signal minimum when reading another of the adjacent tracks.

10. The method of claim 5 and further comprising:
    locking the write clock on to the write phase and frequency detected in all previous reference patterns.

11. The method of claim 1 wherein the initial reference pattern comprises a servo pattern in a servo field and further comprising:
    deploying the servo field on the bit patterned media during a bit patterning process that places a bit pattern on the bit patterned media.

12. The method of claim 1 wherein the initial reference pattern comprises a servo pattern in a servo field and further comprising:
    writing the servo field on the bit patterned media prior to detecting the write phase and frequency based on the servo field.

13. An apparatus comprising:
    a write clock;
    a writer; and
    a controller that locks the write clock to a phase and frequency determined from a reference pattern already disposed on a bit patterned medium, and controls the writer to write a given reference pattern to the bit patterned medium using the write clock.

14. The apparatus of claim 13 wherein the controller locks the write clock to a phase and frequency determined by the given reference pattern and controls the writer to write a subsequent reference pattern to the bit patterned medium using the write clock.

15. The apparatus of claim 14 wherein the controller repeats locking the write clock to a phase and frequency determined by previously written reference patterns and controlling the writer to write a next subsequent reference pattern using the write clock until the bit patterned medium has a predefined number of reference patterns written thereon.

16. The apparatus of claim 15 wherein the bit patterned medium comprises a disc with the predefined number of reference patterns written on adjacent tracks.

17. The apparatus of claim 16 wherein reference patterns on the adjacent tracks are phase coherent with one another.

18. The apparatus of claim 16 wherein the reference patterns each comprise a plurality of bits that define phase coherent patterns, from track-to-track, and that repeat every 6 recorded bits on any two adjacent tracks.

19. The apparatus of claim 16 wherein the reference patterns each comprise a plurality of bits that define phase coherent patterns, from track-to-track, and that repeat every 8 recorded bits on any two adjacent tracks.

* * * * *